United States Patent [19]

Mizushina

[11] 4,061,870
[45] Dec. 6, 1977

[54] TEMPERATURE CONTROL SYSTEM
[75] Inventor: Youichi Mizushina, Hamura, Japan
[73] Assignee: Kokusai Electric Co., Ltd., Tokyo, Japan
[21] Appl. No.: 599,396
[22] Filed: July 28, 1975
[30] Foreign Application Priority Data
July 31, 1974 Japan .................................. 49-88212
[51] Int. Cl.² .......................... F27B 5/00; F27D 19/00
[52] U.S. Cl. ...................................................... 13/24
[58] Field of Search ..................... 13/24; 136/224, 227; 219/10.49

[56] References Cited
U.S. PATENT DOCUMENTS 3,370,120  2/1968  Lasch, Jr. .............................. 13/24 X
3,385,921  5/1968  Hampton ................................. 13/24
3,512,413  5/1970  Von Krusenstierna et al. ..... 136/227

Primary Examiner—R. N. Envall, Jr.
Attorney, Agent, or Firm—Bacon & Thomas

[57] ABSTRACT

A system for controlling the temperature and/or temperature distribution in a semiconductor diffusion furnace. The temperature and/or temperature distribution inside the reactor tube of the furnace is directly detected by thermocouple means inserted in the reactor tube, and correction is effected with respect to the temperature and/or temperature distribution on the basis of the foregoing detection. There are also disclosed thermocouple devices for use with the aforementioned control system. Each of the thermocouple devices can be manufactured at lower cost and is arranged to provide for a high freedom of measurements.

5 Claims, 8 Drawing Figures

FIG. I (A)
PRIOR ART
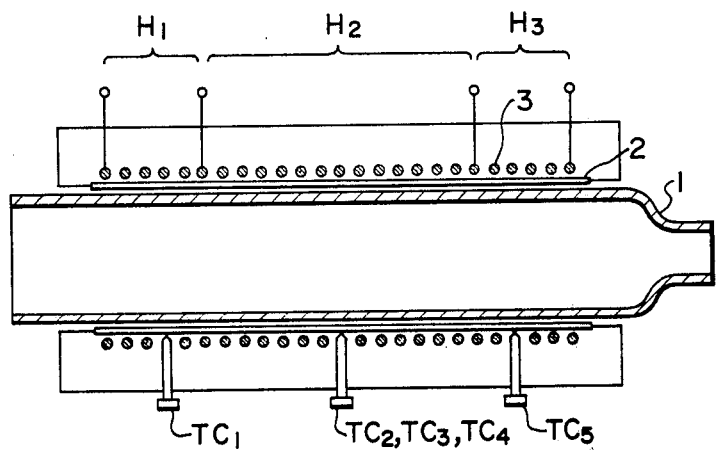
FIG. I (B)
PRIOR ART
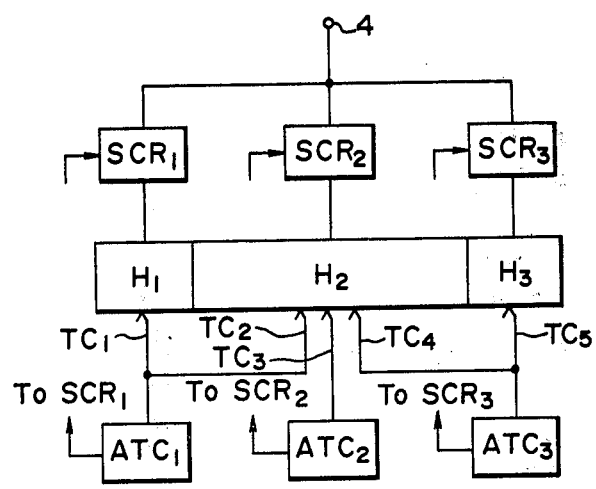

TEMPERATURE CONTROL SYSTEM

BACKGROUND OF THE INVENTION

1. Field of the Invention

This invention relates to a system for controlling the internal temperature of an externally heated furnace such for example as semiconductor diffusion furnace. It is also directed to thermocouple means useful for such a system.

2. Description of the Prior Art

Prior art system for controlling the temperature of a semiconductor diffusion furnace is arranged such that the temperature of a heater provided externally of the furnace is detected to obtain an electrical signal, which in turn is compared with a present reference value, thus controlling the heater temperature to a value corresponding to the present invention reference value. Such a system works effectively when it is employed in such a circumstance that a temperature difference as great as about 10° to 20° C is allowed between the exterior and the interior of the furnace. In actuality, however, the semiconductor diffusion furnace requires more precise temperature control since even as small a temperature variation as about 0.5° to 1° C which tends to result from gas flow variation, will have adverse effect on the yield; hence, the aforementioned prior art system is not satisfactory. Another disadvantage of the conventional system is that a long time is taken before such a small temperature change as mentioned above can be externally detected, since a great heat resistance exists between the furnace temperature and the heater temperature.

In an attempt to detect temperatures at various points which are remote, thermocouples are commonly used which correspond in number to those points and are long enough to extend as far as such points. Obviously, however, it is undesirable to use such thermocouples since each of them is formed of two different types of metal which are expensive in themselves.

SUMMARY OF THE INVENTION

It is an object of this invention to provide a novel furnace temperature control system capable of controlling the internal temperature and/or temperature distribution of a furnace concurrently with processing of a semiconductor wafer or wafers, without measuring the temperature or temperature distribution each time the internal conditions of the furnace vary, thereby making it possible to simplify the operation and monitor the processing temperature.

Another object of this invention is to provide a furnace temperature control system wherein the external furnace temperature or heater temperature is detected to obtain an electrical signal, which in turn is compared with a first reference value to control the heater temperature; and at the same time the internal furnace temperature is also detected, an electrical signal resulting from the internal detection is compared with a second reference value, and the deviation of the detected internal furnace temperature from the second reference value is made to participate in the control of the heater temperature.

Still another object of this invention is to provide a thermocouple device which can be manufactured at lower cost and which provides for a high freedom of measurements.

Other objects, features and advantages will become apparent from the following description taken in conjunction with the accompanying drawings.

BRIEF DESCRIPTION OF THE DRAWINGS

FIG. 1 shows a furnace temperature control system of prior art, wherein FIG. 1A is a schematic side view partly in section of a semiconductor diffusion furnace incorporating such prior art system, and FIG. 1B is a block diagram of the control circuit associated therewith;

FIG. 2 shows an embodiment of this invention, wherein FIG. 2A is a schematic side view partly in section showing a semiconductor diffusion furnace incorporating the furnace temperature control system according to this embodiment of the invention, and FIG. 2B is a block diagram of the control circuit embodying this invention;

DESCRIPTION OF THE PREFERRED EMBODIMENT

In order to give better understanding of this invention, description will first be made of prior art furnace temperature control system with reference to FIG. 1, wherein thermocouples $TC_1$, $TC_2$, $TC_3$, $TC_4$, $TC_5$ are disposed outside a reactor tube 1 formed of quartz, in the vicinity of a heater 3 comprising three heater sections $H_1$, $H_2$ and $H_3$ which are provided externally of the reactor tube 1, with an equalizer tube 2 interposed therebetween, and thus the temperatures of the heater sections $H_1$, $H_2$ and $H_3$ are detected by the associated thermocouples, respectively. As illustrated in FIG. 1B, the thermocouples $TC_1$ and $TC_2$ are connected to an automatic temperature control $ATC_1$ which is arranged to control a thyristor $SCR_1$ for controlling a current flowing from a power source 4 to the heater section $H_1$. The thermocouple $TC_3$ is connected to an automatic temperature control $ATC_2$ which is arranged to control a thyristor $SCR_2$ for controlling a current provided to the heater section $H_2$. The thermocouples $TC_4$ and $TC_5$ are connected to an automatic temperature control $ATC_3$ which is arranged to control a thyristor $SCR_3$ for controlling a current imparted to the heater section $H_3$. In this arrangement, the automatic temperature control $ATC_2$ is so designed as to set up the temperature of the heater section $H_2$ by itself, whereas the automatic temperature controls $ATC_1$ and $ATC_3$ are constructed in the form of deviation type so as to control the thyristors $SCR_1$ and $SCR_3$ so that the deviation always becomes nil. In this way, if a desired temperature is set up by the automatic temperature control $ATC_2$, then the heater sections $H_1$ and $H_3$ will automatically be controlled to provide the same temperature as the heater section $H_2$.

However, it may frequently happen that the internal furnace temperature becomes non-uniform despite the fact that all the heater sections are at an equal temperature, for the reason that the internal temperature distribution tends to vary depending upon the conditions for processing the semiconductor wafers accommodated in the reactor tube as will be seen from FIG. 1A. With the aforementioned prior art arrangement, therefore, it is necessary to measure the internal furnace temperature distribution each time and re-adjust the automatic temperature controls $ATC_1$ and $ATC_3$ accordingly. It may also happen that a difference occurs between the temperature set up by $ATC_2$ and the actual internal furnace temperature; such a difference may also vary depending upon the various processing conditions.

Figure 2:
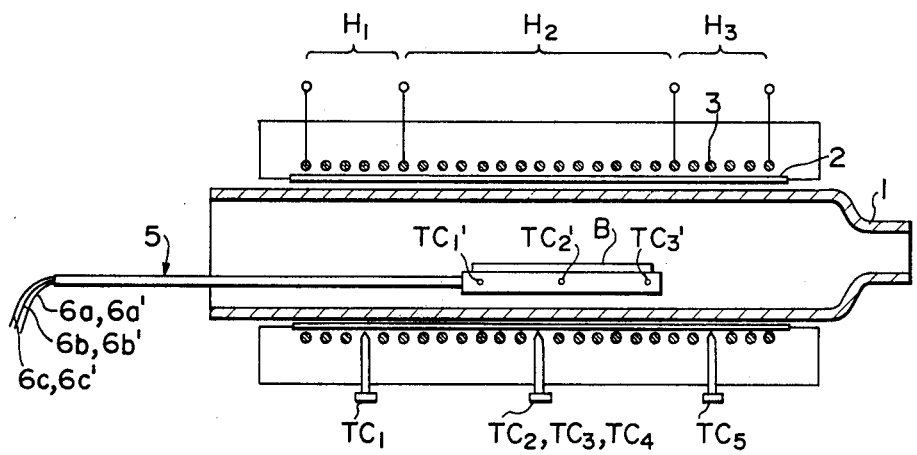
Figure 2:
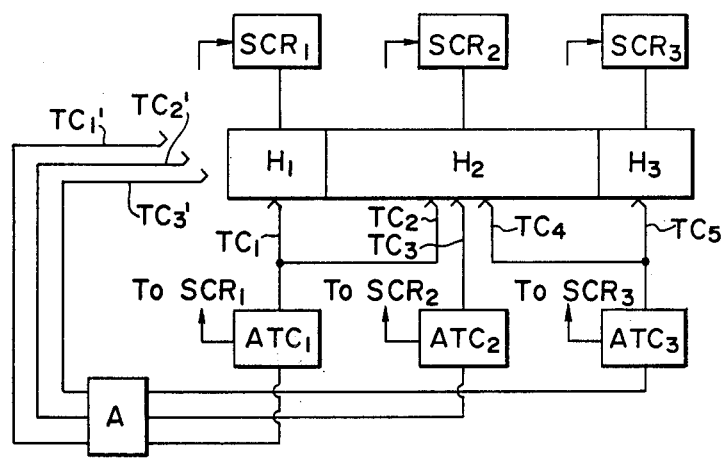
Figure 3:
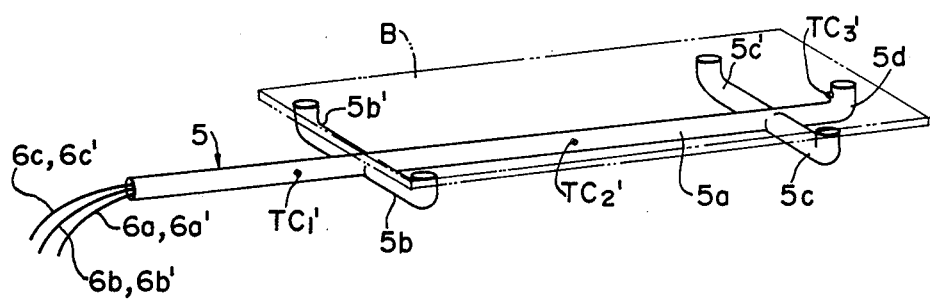
FIG. 3 is a schematic perspective view showing an example of the structure for inserting a wafer boat into a reactor tube or removing the same therefrom.

Referring now to FIGS. 2 and 3, there is shown an embodiment of this invention, wherein parts corresponding to FIG. 1 are indicated by like references.

In this embodiment, three thermocouples $TC_1'$, $TC_2'$ and $TC_3'$ are incorporated in a rod structure 5 which is employed to insert a boat B, on which semiconductor wafers (not shown) to be processed rest, into the reactor tube 1 or remove it therefrom, as will be appreciated from FIG. 2A. These thermocouples are spaced a predetermined distance from each other. As shown in FIG. 3, the rod structure 5 may comprise an axial portion 5a, and boat supporting portions 5b, 5b' and 5c, 5c' which are integrally provided on the axial portion 5a in such a manner as to extend laterally thereof, each of these boat supporting portions being upwardly bent through about 90 degrees at the free end thereof. The rod structure includes another support portion 5d which is also bent upwardly through about 90 degrees. Lead lines 6a and 6a', 6b and 6b', 6c and 6c' for the thermocouples $TC_1'$, $TC_2'$ and $TC_3'$ axially extend inside the rod structure 5. The thermocouples $TC_1'$, $TC_2'$ and $TC_3'$ provided in the rod structure 5 as mentioned above are connected to automatic temperature control circuits $ATC_1$, $ATC_2$ and $ATC_3$ through a temperature correcting circuit A which has a function of temperature setting and feedback for speculative control, respectively, as will best be seen from FIG. 2B.

According to this embodiment of the invention, the absolute value of the temperature detected by the internal thermocouple $TC_2'$ is read by the temperature correcting circuit A so as to be corrected with reference to the set-up value of the temperature detected by the external thermocouple $TC_3$. At the same time, the difference or deviation between the temperatures sensed by the thermocouples $TC_1'$ and $TC_2'$ and that between the temperature detected by the thermocouples $TC_2'$ and $TC_3'$ are also read by the temperature correcting circuit A, which in turn provides a correction command to each of the automatic temperature control circuits $ATC_1$ and $ATC_3$ so that those differences or deviations become nil. The correction with respect to each of the internal thermocouples is provided with such a delay that it is not initiated until the temperature inside the furnace having the aforementioned boat inserted therein becomes stabilized. The temperature correcting circuit A may be interlocked with a mechanism (not shown) for inserting the boat in the furnace or removing the same therefrom, so that the correction may be effected after the boat inserted in the furnace starts rocking at a predetermined position. In the case where the set temperature is greatly changed, a correction will first be effected with no load, and then the boat will be inserted to perform the processing operation.

As will be appreciated from what has been described above, in accordance with this invention, the temperature and/or temperature distribution inside the furnace can be automatically corrected; in the cases where for example the processing conditions are modified or periodical checking is performed, there is no necessity to effect such tedious operations as measuring the internal furnace temperature distribution by means of thermocouples which are individually inserted in the furnace, manually providing a correction to each automatic temperature control in accordance with the result of each measurement, and making confirmation as to whether a uniform temperature distribution is established before starting each processing operation as was the case with the prior art. Although, in the foregoing, description has been made of the case where three thermocouples are incorporated in a rod structure which is adapted to be inserted in the furnace with a boat resting thereon, it is also possible that a single thermocouple may be axially moved in the reactor tube to effect feedback.

Figure 4:
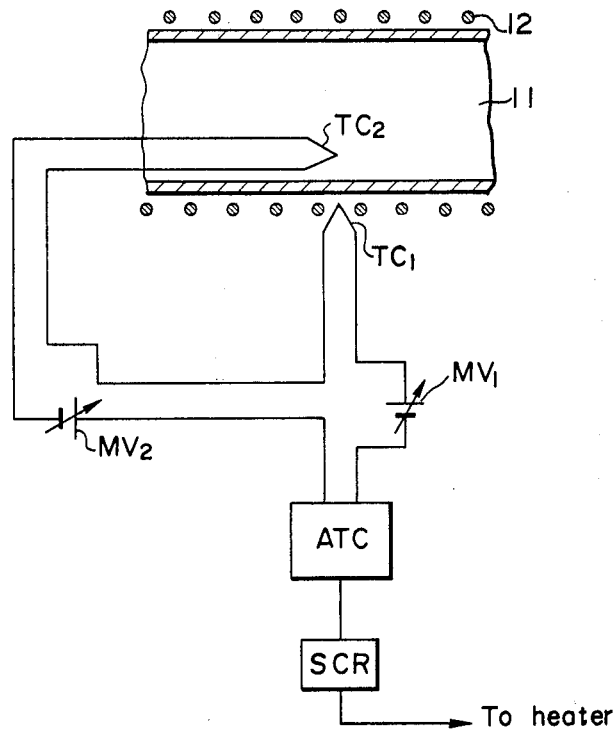
FIG. 4 is a fragmentary sectional side view showing schematically a semiconductor diffusion furnace incorporating the furnace temperature control system according to another embodiment of this invention.

Referring to FIG. 4, there is illustrated the furnace temperature control system according to another embodiment of this invention, wherein a heater 12 is provided around a furnace 11 such as semiconductor diffusion furnace. An external thermocouple $TC_1$ is provided to detect the temperature of the heater 12, and which has one end thereof connected to one of the input terminals of an automatic temperature control device ATC through a mV setter ($MV_1$) which can set up a reference value corresponding to the desired temperature of the heater 12. Also provided inside the furnace is a thermocouple $TC_2$ at a position substantially corresponding to that of the thermocouple $TC_1$. One end of the thermocouple $TC_2$ is coupled to the other end of the thermocouple $TC_1$, and the other end thereof is connected to the other input terminal of the automatic temperature control device ATC through a mV setter ($MV_2$) which can set up a reference value corresponding to the desired internal furnace temperature. The output of the automatic temperature control device ATC is coupled to a control means (SCR) which may be constituted by a thyristor or thyristors, which are corrected to the heater 12.

In operation, the heater 12 is first heated up to the temperature corresponding to the reference value set up by the setter $MV_1$. The heater temperature is detected by the thermocouple $TC_1$, and thus a voltage is obtained which in turn is compared with the reference value set up by the setter $MV_1$. The difference or deviation therebetween is provided to the automatic temperature control device, so that the control means SCR is controlled in accordance with the difference or deviation mentioned above. As a result, the temperature of the heater 12 is controlled so as to conform to that corresponding to the reference value which is set up by the setter $MV_1$. Concurrently, the internal furnace temperature is also detected by the thermocouple $TC_2$, and thus a voltage is obtained which in turn is compared with the reference value of the setter $MV_2$. The difference or deviation therebetween is also provided to the automatic temperature control device ATC in superimposed relationship with that between the voltage corresponding to the temperature sensed by the thermocouple $TC_1$ and the reference value set up by the setter $MV_1$. Thus, the difference or deviation between the voltage corresponding to the temperature sensed by the internal thermocouple $TC_2$ and the reference value set up by the setter $MV_2$ is made to participate in controlling of the heater temperature. In this way, the temperature of the heater 12 is controlled so as to be make the internal furnace temperature conform to the reference value which is set up by the setter $MV_2$. In this case, it is a matter of course that the reference values of the setters MV$_1$ and MV$_2$ are set up by considering the difference between the internal and external temperatures in each furnace temperature range with respect to each furnace. It is also possible that the setters mentioned above may be incorporated in the automatic temperature control device ATC.

In accordance with this invention, as explained above, it is possible to control the heater temperature so as to make the internal furnace temperature participate in controlling of the heater temperature which is effected on the basis of external detection of the heater temperature.

In the foregoing, just for the sake of simplicity, description has been made of the case where the temperature at a single point outside the furnace and that at a single point inside the furnace are detected. However, this invention is not restricted to such a specific case; it will readily be apparent to those skilled in the art that this invention is equally applicable in the cases where temperatures at any desired number of points should be detected to achieve furnace temperature control.

Figure 5:
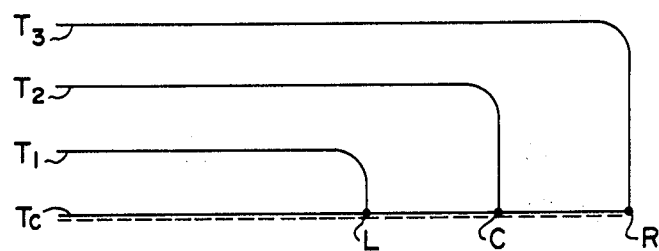
FIGS. 5 and 6 are schematic views showing the thermocouple devices according to this invention, respectively.

Referring to FIG. 5, there is schematically shown the thermocouple device according to a further embodiment of this invention. This thermocouple device comprises a common thermocouple half $T_c$ formed of a first type of metal which is indicated by a parallel combination of a solid line and broken line, and thermocouple halves $T_1$, $T_2$ and $T_3$ formed of a second type of metal which are securely attached, by any suitable means, to the common thermocouple half $T_c$ at preselected points L, C and R which are spaced a predetermined distance from each other, so that three thermocouples are formed by $T_c$ and $T_1$, $T_c$ and $T_2$, and $T_c$ and $T_3$, respectively.

By inserting the aforementioned thermocouple device in a furnace, it is possible to detect the temperature inside the furnace. More specifically, the temperatures at the position corresponding to the point L is detected as voltage between the thermocouple halves $T_c$ and $T_1$; the temperature at the position corresponding to the point C is detected as voltage between the thermocouple halves $T_c$ and $T_2$; and the temperature at the position corresponding to the point R is detected as voltage between the thermocouple halves $T_c$ and $T_3$. Advantageously, it is also possible to easily measure the temperature differences between the respective points. That is, the difference between the temperatures at the points L and C can be detected as voltage between the elements $T_1$ and $T_2$; the difference between the temperatures at the points C and R can be detected as voltage between the elements $T_2$ and $T_3$; and the difference between the temperatures at the points L and R can be detected as voltages between the elements $T_1$ and $T_3$.

Figure 6:
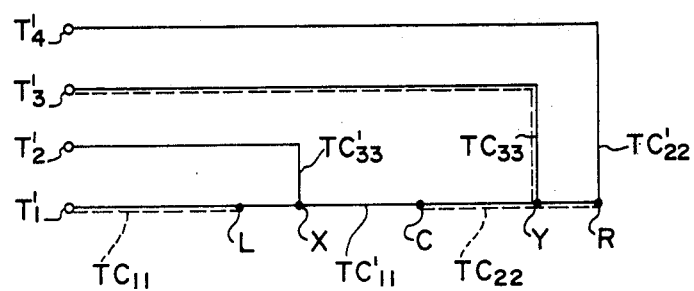

FIG. 6 shows the thermocouple device according to a still further embodiment of this invention. This thermocouple device comprises an alternate arrangement of thermocouple halves $TC_{11}$ and $TC_{22}$ formed of a first type of metal indicated by a parallel combination of a solid line and broken line and thermocouple halves $TC_{11}'$ and $TC_{22}'$ formed of a second type of metal indicated by a solid line which is adapted to form a thermocouple with the first type of metal, wherein those adjacent ones of the thermocouple halves which are different in type from each other, are connected, by any suitable means, to each other so that three thermocouples are constituted by $TC_{11}$ and $TC_{11}'$, $TC_{11}'$ and $TC_{22}$, and $TC_{22}$ and $TC_{22}'$, respectively. Furthermore, terminals $T_1'$ and $T_4'$ are taken out from the thermocouple halves $TC_{11}$ and $TC_{22}'$ at the opposite ends of the alternate arrangement respectively, and terminals $T_2'$ and $T_3'$ are taken out from any desired points X and Y of the thermocouple halves $TC_{11}'$ and $TC_{22}$ through lead wires $TC_{33}'$ and $TC_{33}$ which are formed of the aforementioned first and second types of metal respectively. In this case, it is to be noted that points X and Y can be selected as desired; for example, the point X may overlap the point L or C, and point Y may also overlap the point C or R.

In operation, the thermocouple device is inserted in a furnace. Thus, the temperature at the position corresponding to the point L is detected as voltage between the terminals $T_1'$ and $T_2'$; the temperature at the position corresponding to the point C is detected as voltage between the terminals $T_2'$ and $T_3'$; and the temperature at the position corresponding to the point R is detected as voltage between the terminals $T_3'$ and $T_4'$. It is also possible to measure the temperature differences between the respective thermocouple points. That is, the difference between the temperatures at the points R and C is measured between the terminals $T_2'$ and $T_4'$; the difference between the temperatures at the points C and L is measured between the terminals $T_1'$ and $T_3'$; and the difference between the temperatures at the points R and L is measured between the terminals $T_1'$ and $T_4'$, with the terminals $T_2'$ and $T_3'$ short-circuited.

In FIGS. 5 and 6, only three thermocouples are shown, but this is just for the sake of simplicity; this invention is equally applicable in the cases where any desired number of thermocouples are to be formed, as will readily be appreciated by those skilled in the art. In accordance with this invention, it is possible to greatly reduce the number of thermocouple halves required. More specifically, in the case of the prior art, as many as $2n$ thermocouples were needed to make $n$ thermocouples, whereas in the case of this invention, only $(n+1)$ thermocouple halves are enough to make $n$ thermocouples.

What is claimed is:

1. A system for establishing a uniform temperature distribution within a reactor tube of a furnace comprising:
   a. a furnace having a reactor tube therein,
   b. first temperature detection means disposed internally of said reactor tube,
   c. heater means disposed externally of said furnace for heating said furnace,
   d. first temperature control means responsive to said first temperature detection means for controlling said heater means,
   e. second temperature detection means disposed externally of said reactor tube and in the vicinity of said heater for detecting the temperature of said heater, and
   f. second temperature control means responsive to said second temperature detection means for controlling said heater means,
   whereby said heater is controlled to establish a uniform temperature distribution within said reactor tube.

2. The system as defined in claim 1 wherein:
   a. said first temperature detection means comprises a plurality of individual temperature detectors,
   b. said second temperature detection means comprises a plurality of individual temperature detectors,
   c. said heater comprises a plurality of heater sections, d. said first temperature control means comprises a common temperature control device responsive to said second temperature control means, and
e. said second temperature control means comprises a plurality of individual temperature control devices.

3. The system as defined in claim 2 wherein:
a. said first temperature control means further includes a first reference point setting means,
b. each of said second temperature control means further includes a second reference point setting means and is responsive to a second signal generated by said second temperature detection means to control the difference between said second signal and said second reference point to a predetermined value, and
c. said first temperature control means is responsive to a first signal generated by said first detection means to control said second reference point setting means of said second temperature control means in accordance with the difference between said first signal and said first reference point.

4. The temperature control apparatus defined in claim 3 wherein said first temperature detection means comprises a thermocouple comprising:
a. a first common thermocouple half formed of a first type of metal,
b. a plurality of second thermocouple halves formed of a second type of metal,
c. said plurality of second thermocouple halves being connected to said first common thermocouple half in a predetermined spaced relationship for forming a plurality of thermocouples.

5. The temperature control apparatus defined in claim 3 wherein said first temperature detection means comprises a thermocouple comprising:
a. a plurality of first thermocouple halves formed of a first metal,
b. a plurality of second thermocouple halves formed of a second metal,
c. said pluralities being arranged so that adjacent first and second thermocouple halves are connected thereby forming a plurality of thermocouples,
d. terminals connecting to said thermocouples being taken out from said thermocouple halves at opposite ends of the combined halves.

* * * * *